United States Patent [19]

Schröder

[11] 4,241,947
[45] Dec. 30, 1980

[54] VEHICLE WITH TRANSFORMABLE LOADING AREA

[76] Inventor: Georg Schröder, Schulstrasse 10, D-3588 Homberg, Bez. Kassel 1, Ortsteil Cassdorf, Fed. Rep. of Germany

[21] Appl. No.: 65,047

[22] Filed: Aug. 9, 1979

[30] Foreign Application Priority Data

Aug. 23, 1978 [DE] Fed. Rep. of Germany ....... 2836754

[51] Int. Cl.³ .............................................. B60P 3/42
[52] U.S. Cl. .................................... 296/10; 105/243; 280/5 F; 296/183; 298/24
[58] Field of Search ........................... 296/10, 15, 183; 280/5 C, 5 D, 5 E, 5 F; 298/1 R, 24, 25; 105/363, 247, 248, 243

[56] References Cited

U.S. PATENT DOCUMENTS 2,768,021  10/1956  Kaster .................................. 105/243
3,906,737  9/1975  Brown ................................... 105/247

Primary Examiner—John P. Silverstrim
Assistant Examiner—John A. Carroll
Attorney, Agent, or Firm—Spencer & Kaye

[57] ABSTRACT

A vehicle for the selective transport of a piece load or a bulk load has a container including a bottom constituting, at least in part, a funnel having a discharge opening, a top closure arranged above the bottom and collapsible side walls attached to the bottom and the top closure. The side walls are formed of a plurality of relatively rigid side wall elements having, in a lowered position of the top closure, a collapsed state in which they are stacked with respect to one another between the top closure and the bottom. In the collapsed state of the side walls the upper face of the top closure serves as a loading platform for a piece load. The side walls further have, in a raised position of the top closure, an erected state in which the side wall elements together contiguously form sealed side walls.

18 Claims, 9 Drawing Figures

VEHICLE WITH TRANSFORMABLE LOADING AREA

BACKGROUND OF THE INVENTION

This invention relates to a vehicle for the selective transport of goods having a permanent configuration (hereafter piece load) or bulk goods, such as powdery, granular or liquid material (hereafter bulk load). For the transport of bulk load, a stackable or foldable container is used, whose top closure serves as a supporting platform for a piece load. The underside of the container is shaped as a funnel which is oriented on all sides towards a discharge opening provided in the container bottom.

Multi-purpose vehicles of the above-outlined type have to satisfy a number of requirements. One of the most important requirements is to provide for the necessary imperviousness and rigidity of the foldable container. Further, when the vehicle is used for transporting piece load, the load capacity should not be limited by the presence of the collapsed container and further, a conversion of the vehicle from the one mode of application to the other should occur in a simple and rapid manner.

Structures of the above-outlined type are known in a great variety. They do not, however, satisfy all the numerous requirements and consequently, they have not been utilized extensively. A multi-purpose vehicle as disclosed in German Pat. No. 2,308,029 best satisfies the practical requirements at the present time. In the vehicle disclosed therein, the top closure of the foldable container has at its underside a plurality of reinforcing ribs, whose height is designed according to the inclination of the container bottom on which the reinforcing ribs of the lowered closure rest to constitute a supporting surface for a piece load. The foldable side walls of the container are made of a material which has no form-stability, such as a fabric lined with a plastic.

Although a multi-purpose vehicle of the above-outlined type was found to operate satisfactorily under normal conditions, it has, however, the disadvantage—as many other known types of vehicle whose container has walls made of flexible, pressure-resistant and liquid-proof materials of the above type—that it can be damaged by external forces acting on these walls; thus, for example, the risks are high that the side walls are pierced accidentally. Further, a satisfactory folding of such flexible side walls and their arrangement between a bottom and a top closure is very circumstantial.

SUMMARY OF THE INVENTION

It is an object of the invention to provide an improved vehicle of the above-outlined type which avoids the discussed disadvantages to a large degree.

This object and others to become apparent as the specification progresses, are accomplished by the invention, according to which, briefly stated, the side walls are composed of a plurality of rigid, individual elements which are sealed with respect to one another as well as with respect to the container bottom and the top closure inasmuch as they are in an adjoining relationship therewith. The individual elements are so designed that as the top closure is lowered towards the bottom, they fold towards one another or slide into one another.

Thus, in the container structure according to the invention, only form-stable materials are used, whereby the risks of damage caused by violent external forces imparted on the container walls are substantially reduced. It is a further advantage of the invention that, apart from the necessary arrangements for raising and lowering the container closure, which may include conventional hydraulic cylinders, no expensive means or arrangements and associated controls are necessary for pressurizing the inner space of the container. The inner wall of the container is expediently lined with a thin and flexible plastic shell for increasing the operational safety and reliability. The inner shell is expediently replaceable; this is of particular advantage when significantly dissimilar goods, such as foodstuff (for example, milk, grain or the like), are to be transported. In such a case, shells made of natural material are used. Thus, such a vehicle may be utilized, in contradistinction to vehicles known heretofore, in a very diversified manner.

The invention will be explained by describing two embodiments. One embodiment illustrates the principle of folding the lateral wall members while the other embodiment illustrates the principle of sliding the wall components into one another.

In the first embodiment the side walls are formed by rail-like or slat-like components (hereafter "slats") which are arranged close to one another and which, in their length dimension, are subdivided into several salt portions which are articulated to one another in such a manner that every two adjoining slat portions fold inwardly towards one another upon lowering the top closure towards the bottom and as the top closure is in its fully lowered position, they lie flat on one another and are supported by the vehicle chassis and at the same time serve as a support for the top closure.

In the second embodiment the side walls are formed of a plurality of band-shaped loops or rings made of a firm material. At least some of the loops have a conical shape so that in the lowered position of the top closure they nest in one another and are supported by the vehicle chassis. When the top closure is raised, it carries with it the outermost loop which is affixed to the top closure, and then, by virtue of the conical shape of the individual loops, these are lifted one after the other by the previous loop of the larger cross section, down to the loop of the smallest cross section which is affixed to the rigid, funnel-like bottom portion. Thus, in the upper terminal position of the top closure, all the loops that form the side walls are, with their upper and lower edges, tightly connected with the adjoining strip and form a closed container.

DESCRIPTION OF THE PREFERRED EMBODIMENTS

Figure 1:
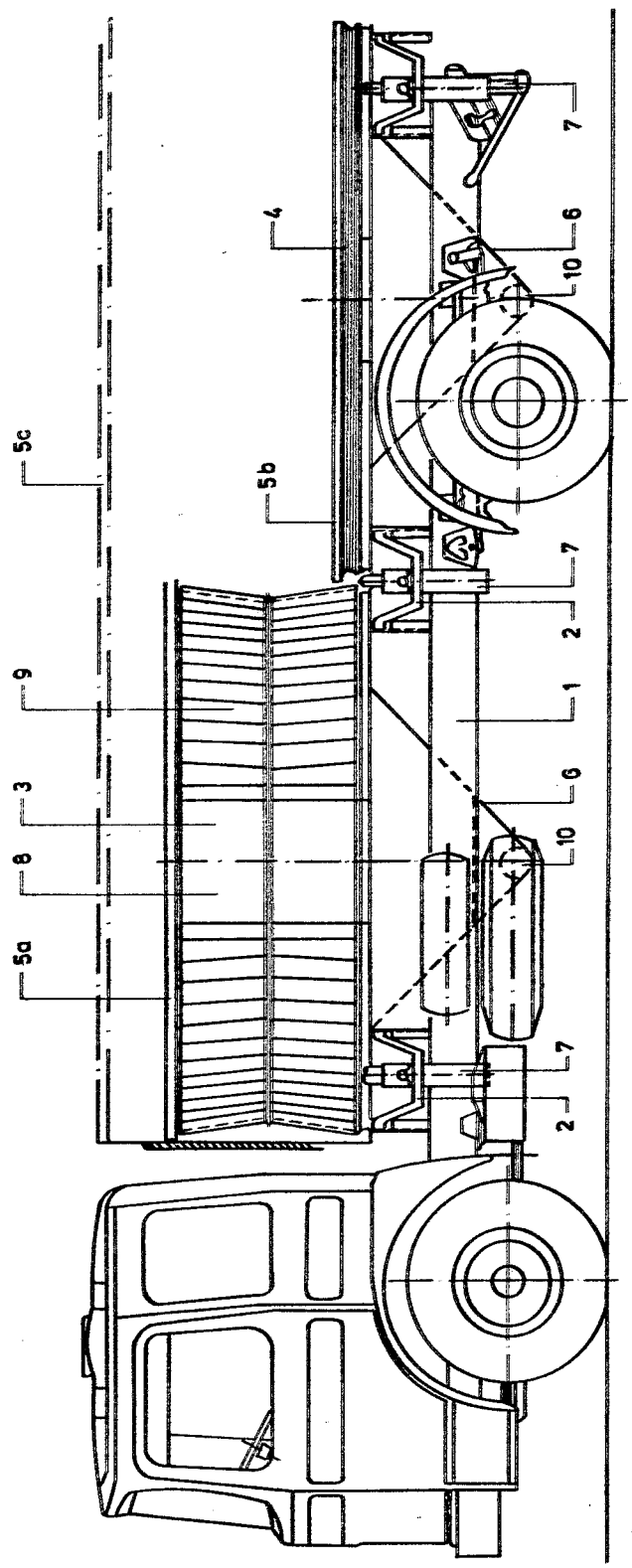
FIG. 1 is a schematic side elevational view of a first preferred embodiment of the invention.
Figure 2:
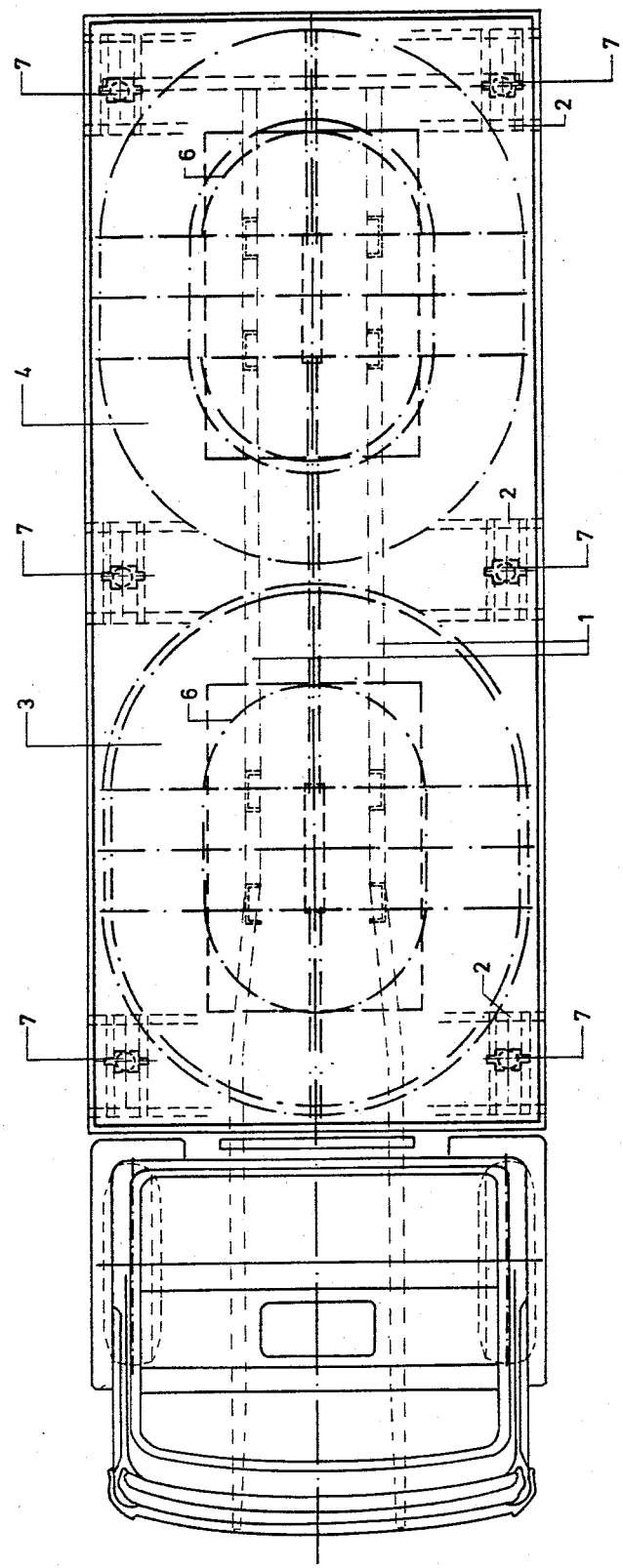
FIG. 2 is a schematic top plan view of the first embodiment.

Turning now to FIGS. 1 and 2, the vehicle shown therein is a truck of conventional construction, details of which will be discussed in the description which follows only to the extent as necessary for describing additional equipment needed for its multiple use.

The vehicle chassis has conventional longitudinal and transverse beams 1 and 2, respectively, on which, as viewed along the longitudinal axis of the vehicle, there are provided two collapsible containers 3 and 4 for carrying a bulk load. The front container 3 is shown in its erected state, whereas the rear container 4 is illustrated in its collapsed condition. Dependent upon the length of the vehicle, it is feasible to accommodate more than two containers. The two containers 3 and 4 have a common top closure plate 5 which is made of a rigid, load-supporting material and which, in the collapsed state of the container, is utilized as the loading platform for piece load. The height position of the closure 5 is designated at 5a for the erected position of the container and is designated at 5b for the collapsed state of the container. The dash-dotted height level designated at 5c represents a height position which the closure 5 can temporarily assume during the emptying of the container. The container bottom is formed of a funnel-shaped fixed bottom part 6 which, at the upper funnel edge, has a cross-sectional area which is smaller than the cross-sectional area of the container at the top closure 5. The difference between the two areas is compensated for in the collapsed state of the container by parts of the side walls as it will be discussed later in more detail. At the lower end of the funnel 6 there is provided a discharge opening. The raising and lowering of the closure 5 is effected with the aid of six hydraulic cylinders 7.

The side walls 8 of the container are formed of a plurality of slats 9 which form a tightly adjoining series and which, in their length, are subdivided into jointed slat elements. The slats, together with the top closure and the container bottom, form the container 3 or 4, respectively, each having an approximately oval, horizontal cross section. The top closure 5 has a rectangular outline and, as noted above, may be common to both containers. It is, however, feasible to provide each container with its own separate top closure which can be individually raised or lowered, so that the vehicle may be simultaneously used for transporting bulk load and piece load in which case, in each instance, one half of the loading capacity is utilized.

Figure 3:
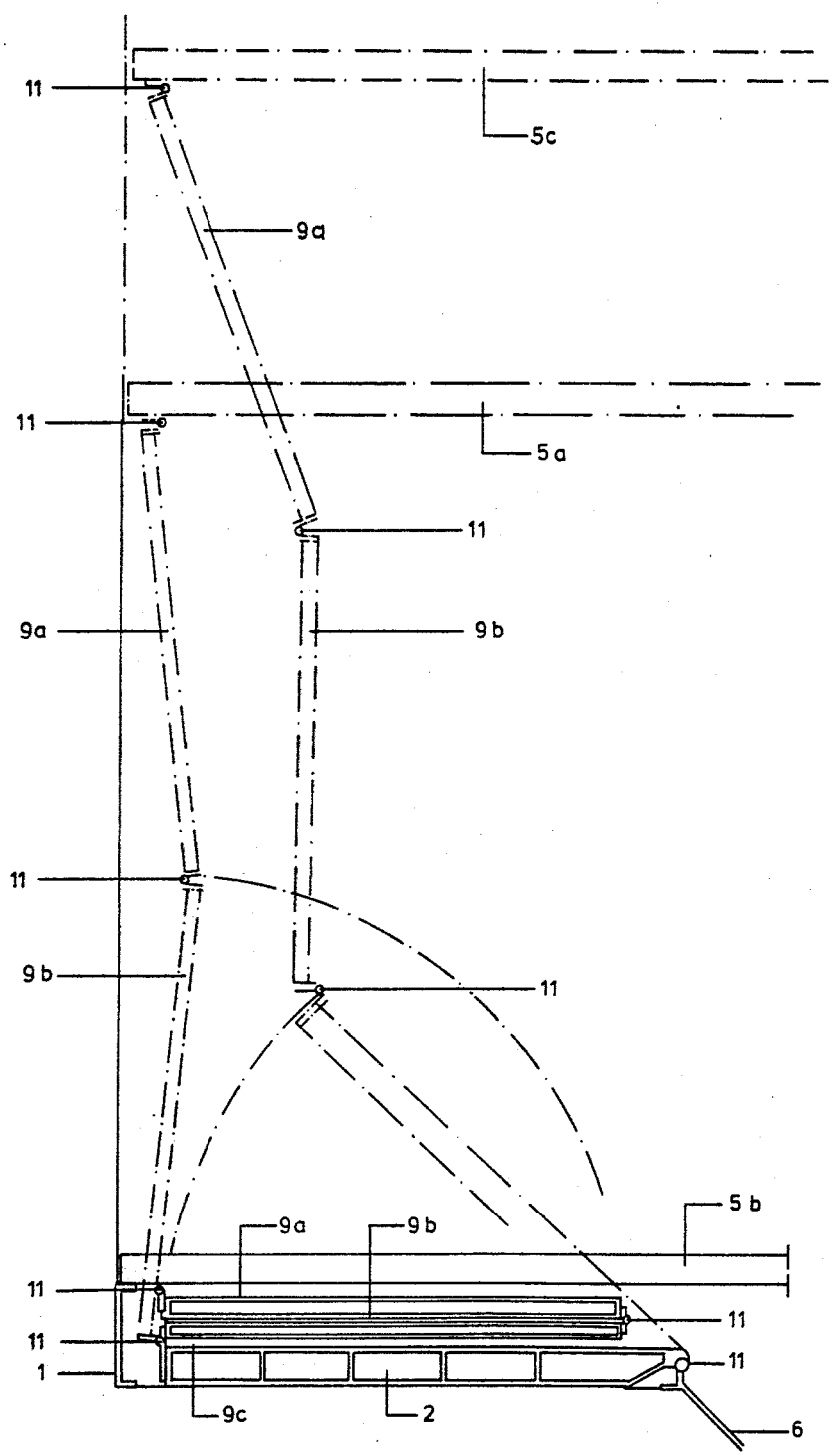
FIG. 3 is a schematic side elevational view of part of the first embodiment.
Figure 4:
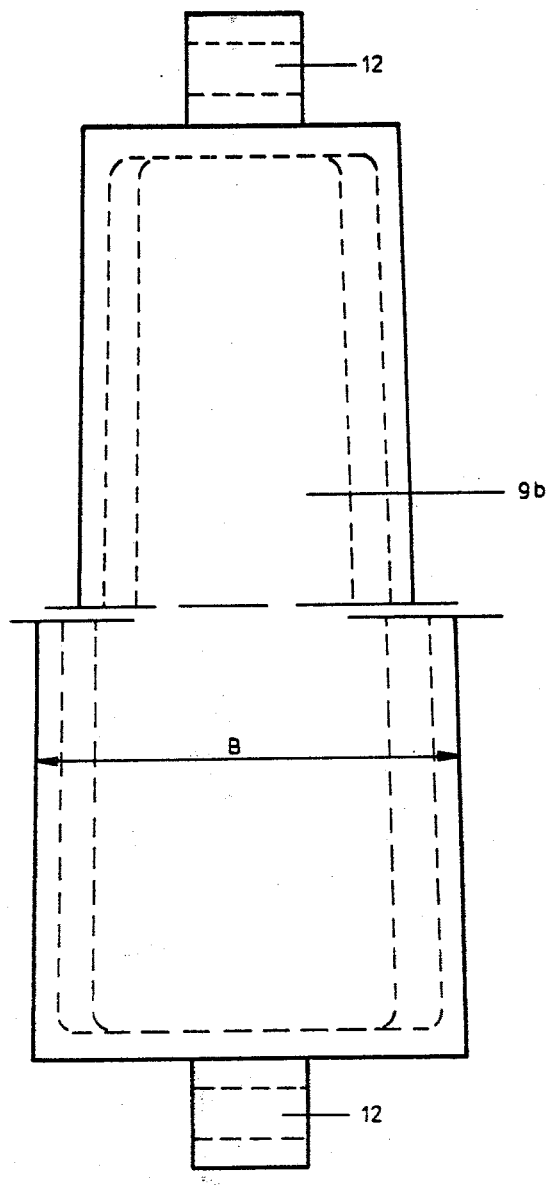
FIG. 4 is a schematic front elevational view of a component of the first embodiment.
Figure 5:
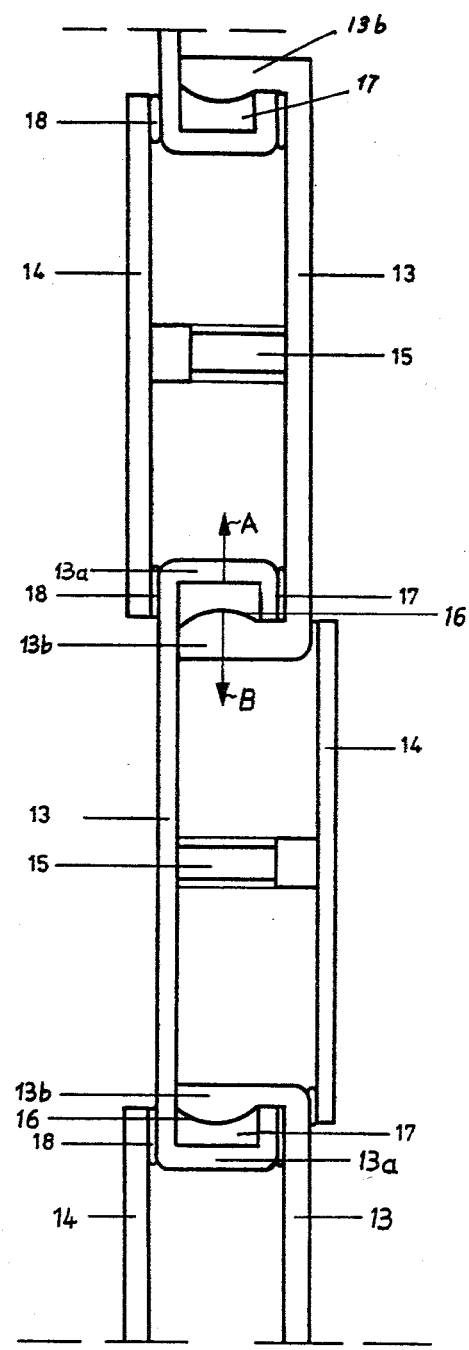
FIG. 5 is a top plan view showing the arrangement of a plurality of components shown in FIG. 4.

Turning now to FIGS. 3, 4 and 5, there will be described in detail the structure and functioning of the side walls 8. Each slat 9 is subdivided into three length portions 9a, 9b and 9c which, in the collapsed state of the container, lie flat on the vehicle chassis as it may be observed in FIG. 3. The lowermost partial slat 9c is articulated to the upper edge of the funnel 6. Similarly, the partial slats are, along themselves, articulated to one another, and further, the uppermost partial slat 9a is articulated to the top closure 5. The joints providing for a pivotal motion of the partial slats with respect to the component to which it is articulated, are designated at 11. The various height positions of the closure are, similarly to FIG. 1, designated at 5a, 5b and 5c. The corresponding positions of the slats 9 forming the side walls are shown in phantom lines in FIG. 3. It is seen that upon raising the closure 5 from its lowermost position of rest, first the partial slats 9a are lifted, followed by the partial slats 9b. The partial slats 9c lie, in the normal, erected position of the container—that is, when the top closure plate 5 is in the position 5a—still on the vehicle chassis and complement the bottom face from the edge of the funnel 6 to the outer bottom edge of the container. Upon emptying the container, the closure 5 is further raised to position 5c, whereupon the partial slats 9c are raised as well and enlarge the funnel 6 at approximately the same angle of inclination as that of the funnel walls, whereby a very satisfactory emptying of the container can be effected.

To ensure that in each position of the slats there is obtained a secure seal between the slats themselves as well as between the slats and the bottom or the closure, each partial slats, such as, for example, slat 9b, as shown in FIG. 4, tapers towards the end which, upon folding, moves towards the inside of the container. The rate of such a taper is dependent upon the radius of curvature of the side wall of the container. Each partial slat is provided at its ends with eyelets 12 for forming the articulation 11.

Turning now to FIG. 5, in order to ensure that despite a change in the slat width B (FIG. 4) along the height of the partial slats, a good seal with respect to an adjoining slat is maintained, each individual partial slat is formed of two parallel-spaced parts 13 and 14 connected by a removable spacer bolt 15. Each part 13 has bent leg portions at its ends, while each part 14 is planar throughout. The structure of the part 13 alternates from partial slat to partial slat as viewed in the horizontal direction from slat to slat. Thus, in one instance, the bent leg portions 13a of the part 13 of one slat 9 have a U-shaped (twice bent) configuration, whereas the part 13 of the partial slat of the adjoining slat 9 has legs 13b of a single-bend configuration. Adjoining legs 13a and 13b interengage in a hook-like manner. That face of each leg 13b which is oriented towards the "U" of the adjoining leg 13a has a convex shape 16. Such a design of the partial slats permits their transverse displacement with respect to one another in a horizontal direction as indicated by the arrows A and B. Between the angled portions of adjoining slats there are provided seals 17 of such dimension and yield that in the zone of the transversal mobility, the mutual seal of the partial slats belonging to adjoining slats is maintained along their edges. Further, between the interengaging zones of the partial slats there are provided sealing strips 18.

Figure 6:
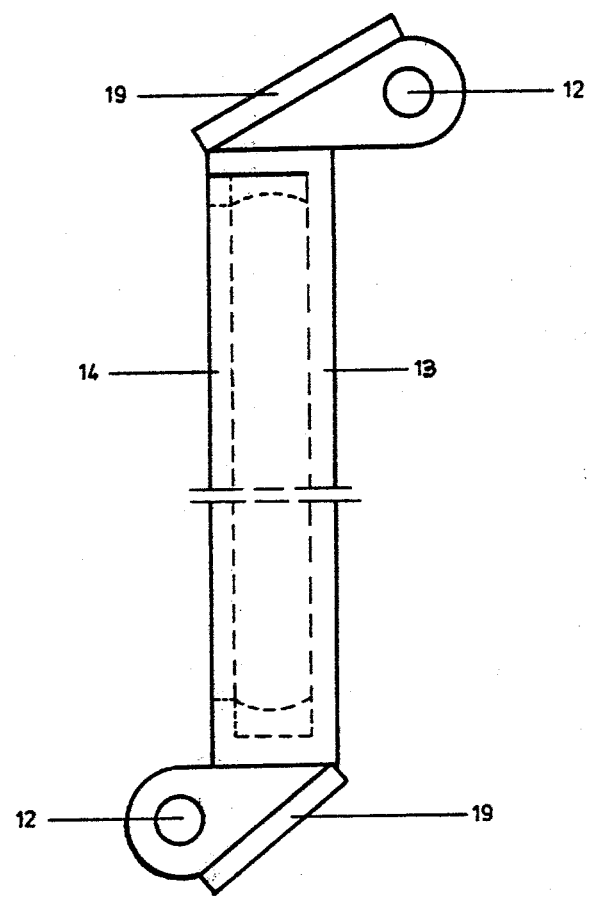
FIG. 6 is a side elevational view of the component shown in FIG. 4.

FIG. 6 shows in side elevation (viewed from the location of an adjoining slat) a partial slat 9 having at its ends eyelets 12 for forming the joints which carry sealing inserts 19.

Figure 9:
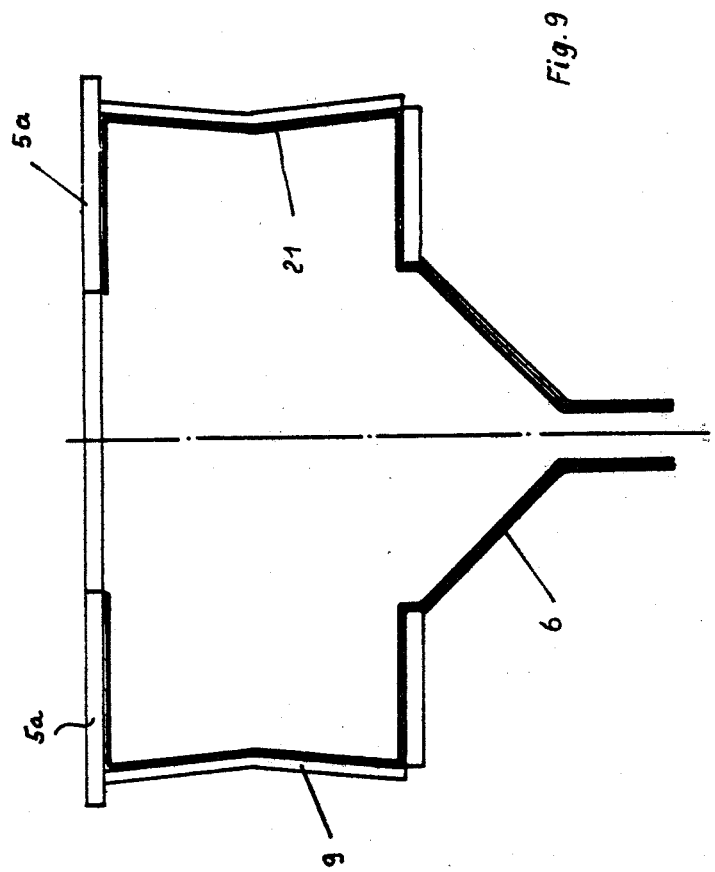
FIG. 9 is a schematic vertical section of the first embodiment of the invention showing the inner flexible shell.

In order to securely exclude the danger of leaks, it is expedient to provide the container with an impervious synthetic inner shell as shown in FIG. 9 which is preferably loosely and replaceably positioned therein. Such an arrangement is of particular advantage if goods of unlike properties such as various foodstuff are to be transported. These shells have a configuration which is adapted to the inner space of the container and, during filling, lie by themselves against the inner walls 5a, 6 and 9 of the container. The shells are provided with a bottom outlet for discharging the material stored therein through the discharge opening provided in the container. The shell 27 is made of a thin flexible plastic of such kind, which does not have any infringing influence on the foodstuff to be transported in it.

Figure 8:
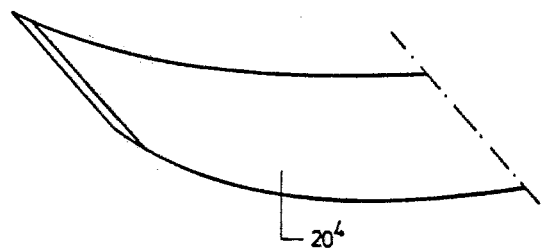
FIG. 8 is a schematic perspective view of a component of the second preferred embodiment.
Figure 7:
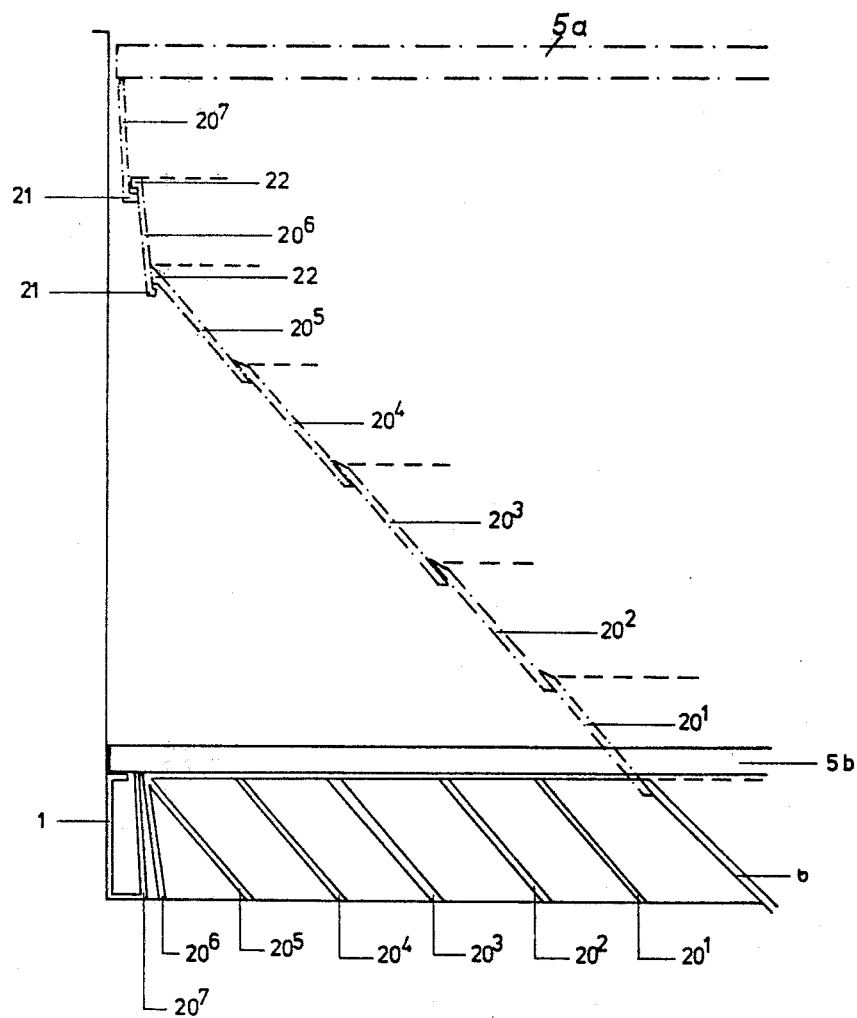
FIG. 7 is a schematic side elevational view of a part of a second preferred embodiment of the invention.

Turning now to FIGS. 7 and 8, there is illustrated a second preferred embodiment of the invention. In FIG. 7, the solid lines show the container in its collapsed state, whereas the dash-dotted lines illustrate the container in its erected condition. The side walls of the container are, in this embodiment, formed of a plurality of loop-like strips made of a firm material such as sheet aluminum. If it is assumed that the shape of the container in this embodiment is the same as in the first embodiment, the loops have the form of oval rings of different sizes as compared to one another. Further, at least some of the loops have a conical configuration so that upon lowering the top closure 5, they are nesting in one another and rest on the beams 1 and 2 of the chassis (only beam 1 is shown in FIG. 7) and thus concentrically surround the funnel-shaped bottom 6. In FIG. 7, the loops are designated from the inside outwardly at $20^1$, $20^2$, . . ., $20^7$. The loops $20^1$ to $20^5$ have such a conicalness that when the top closure 5 is in its raised position, they enlarge the funnel 6 up to the outer container edge at approximately the same angle of inclination as that of the funnel walls. Viewed further outwardly, loops $20^6$, $20^7$ and, if necessary, additional loops follow which have a smaller conicalness or (particularly at the outside) have approximately straight walls. They then together form practically vertical side walls of the container. It is to be understood that the arrangement, number and conicalness of the loops may vary for different structures.

The embodiment illustrated in FIG. 7 operates as follows:

As the top closure 5 is raised from its collapsed position 5b, it carries with it the outermost loop $20^7$ secured thereto. After an inwardly bent leg 21 of the loop $20^7$ engages an outwardly bent leg 22 of the adjoining loop $20^6$, the latter is lifted by the upwardly moving loop $20^7$. The following loop $20^5$ is similarly lifted. The next loop in the sequence, namely loop $20^4$ is entrained by the loop $20^5$ not by virtue of interengaging legs, but because of the conicalness of loops $20^4$ and $20^5$. This conicalness is such, that the circumference of the lower terminal edge of the loop $20^5$ is smaller than the circumference of the upper terminal edge of the loop $20^4$ and thus the outer face of the upper marginal portion of loop $20^4$ wedges against the inner face of the lower marginal portion of loop $20^5$. The consecutive loops $20^3$, $20^2$ and $20^1$ are similarly lifted, until the top closure 5 reaches its position 5a.

The edge zones of all the loops are, similarly to the first embodiment, provided with a sealing material. The preferably hydraulic drive for the closure 5 is so designed that the closure 5 can be locked in its upper terminal position and thus holds tightly together the loops while exerting a tension thereon. FIG. 8 illustrates in a perspective showing one portion (approximately ¼ of the circumference) of one of the conical loops. The number and wall height of the individual loops may be varied dependent upon requirements involved with the vehicle equipped with the containers.

It is to be understood that the containers are not limited in their application to trucks; they may be mounted, for example, on railed vehicles as well.

It is to be understood that the above description of the present invention is susceptible to various modifications, changes and adaptations and the same are intended to be comprehended within the meaning and range of equivalents of the appended claims.

What is claimed is:

1. In a vehicle for the selective transport of a piece load or a bulk load, having a container including a bottom constituting, at least in part, a funnel having a discharge opening, a top closure arranged above the bottom and collapsible side walls attached to the bottom and the top closure; and means for raising and lowering the top closure to place, respectively, the container in an erected position for receiving a bulk load and in a collapsed position for receiving a piece load on an upper face of the top closure; the improvement wherein said side walls comprise a plurality of relatively rigid side wall elements having, in a lowered position of said top closure, a collapsed state in which they are stacked with respect to one another between said top closure and said bottom and further having, in a raised position of said top closure, an erected state in which the side wall elements together contiguously form said side walls; further comprising sealing means for sealing adjoining side wall elements with respect to one another and with respect to said top closure and said bottom in the erected state of said side walls.

2. A vehicle as defined in claim 1, wherein said container is provided in a plurality of numbers; the containers being arranged in series along the longitudinal axis of the vehicle and each having an oval horizontal outline; said top closure beng a single plate of rectangular configuration associated with all said containers.

3. A vehicle as defined in claim 1, further comprising a plastic inner shell positionable in said container in the erected state of said side walls; said plastic shell conforming to the inner configuration of said container.

4. A vehicle as defined in claim 1, wherein said side wall elements are of a light metal.

5. A vehicle as defined in claim 4, wherein said light metal is cast aluminum.

6. A vehicle as defined in claim 1, wherein said vehicle has a chassis and further wherein said side wall elements comprise a plurality of slats each having a first end articulated to a peripheral part of said top closure and a second end articulated to said bottom; each slat being formed of a plurality of partial slats articulated end-to-end to one another; in said collapsed state the partial slats of each slat being folded onto one another within the outline of said top closure and the folded slats resting on said chassis and supporting said top closure; in said erected state at least some of the partial slats of each slat assuming generally a vertical orientation in a close, side-by-side arrangement.

7. A vehicle as defined in claim 6, wherein said funnel forms a central part of said bottom; further wherein each slat has a lowermost partial slat articulated at said second end to said funnel at an upper edge portion thereof; further wherein said side walls have a first erected position in which the lowermost partial slats assume a collapsed, horizontal position about said funnel and the other partial slats assume a substantially vertical position; and further wherein said side walls have a second erected position in which said lowermost partial slats are oriented upwardly from said upper edge of said funnel at an angle approximately corresponding to that of the inclination of walls of said funnel.

8. A vehicle as defined in claim 6, further comprising means for interconnecting adjoining slats at longitudinal edges thereof and means for providing for a limited transverse displacement of said slats relative to one another in a direction perpendicular to the length dimension of said slats upon motion of said slats from one of said states into the other.

9. A vehicle as defined in claim 6, wherein said slats have different widths as compared to one another dependent upon the horizontal cross-sectional shape of the container and further wherein each slat has a tapering width towards that end thereof which moves in the direction of the inside of the container when set from said erected state to said collapsed state.

10. A vehicle as defined in claim 6, wherein each partial slat is formed of parallel-spaced first and second parts held together by a removable spacer; said first part having, along opposite longitudinal edges, a leg portion oriented towards said second part; adjoining said leg portions belonging to different, adjoining slats being in an interlocking relationship with one another permitting a limited transverse displacement of said slats with respect to one another in a direction perpendicular to the length dimension of said slats upon motion of said slats from one of their said states into the other.

11. A vehicle as defined in claim 10, wherein said second part of each partial slat is a flat plate.

12. A vehicle as defined in claim 10, wherein said sealing means comprises seals arranged between adjoining longitudinal edge zones belonging to different adjoining slats; said seals maintaining a sealing effect both in the collapsed and in the erected state of said side walls.

13. A vehicle as defined in claim 1, wherein said vehicle has a chassis and wherein said side wall elements are loops of different circumference arranged generally concentrically with respect to said funnel; the loop of greatest circumference being affixed to said top closure and the loop of smallest circumference being at least retainable by said funnel; in said collapsed state said loops nesting in one another on said chassis and supporting said top closure; further comprising coupling means connecting each said loop with an adjoining loop of greater circumference, whereby said loops serially entrain one another upon upward movement of said top closure; in said erected state each said loop being, along circumferential marginal portions, in close contact with one another.

14. A vehicle as defined in claim 13, wherein at least some adjoining loops have a conical shape, whereby the circumference of opposite edges of each conical loop is different; and further wherein the greatest circumference of any of said conical loops is greater than the smallest circumference of the immediately surrounding conical loop.

15. A vehicle as defined in claim 13, wherein the loop closest to said funnel and at least one additional, consecutively adjoining loop are said conical loops; the conicalness of said conical loops at least approximately corresponds to that of said funnel.

16. A vehicle as defined in claim 13, wherein said sealing means comprise seals arranged circumferentially along loop portions engaging one another in said erected state.

17. A vehicle as defined in claim 13, wherein at least some adjoining loops have an approximately cylindrical shape; said coupling means comprising radially oriented legs extending from an edge zone of the cylindrical loop in the direction of any immediately adjoining cylindrical loop; adjoining legs belonging to immediately adjoining cylindrical loops abutting against one another upon displacement of the cylindrical loops relative to one another in an axial direction.

18. A vehicle as defined in claim 17, wherein the loop affixed to said top closure and at least one additional, consecutively adjoining loop are said cylindrical loops.

* * * * *